United States Patent [19]

Fontaine

[11] Patent Number: 4,608,825
[45] Date of Patent: Sep. 2, 1986

[54] AUTOMATIC BRAKE ACTUATOR WITH CONTROLLED RELEASE

[75] Inventor: William G. Fontaine, Pompano Beach, Fla.

[73] Assignee: Fail Safe Brake Corporation, Ft. Lauderdale, Fla.

[21] Appl. No.: 540,060

[22] Filed: Oct. 7, 1983

[51] Int. Cl.[4] .................. F15B 7/00; B60K 28/00
[52] U.S. Cl. ............................. 60/545; 60/547.1; 180/272; 180/273; 303/19
[58] Field of Search ............... 60/376, 547.1, 582, 60/545, 550, 560; 91/509, 510, 519; 188/109, 353; 303/18, 19; 180/272, 273, 278

[56] References Cited

U.S. PATENT DOCUMENTS

| | | | |
|---|---|---|---|
| 3,303,836 | 2/1967 | Burleigh | 180/273 |
| 3,385,636 | 5/1968 | Cruse | 91/510 |
| 3,790,223 | 2/1974 | Fontaine | 303/19 |
| 3,830,330 | 8/1974 | Fontaine | 180/273 |
| 4,071,283 | 1/1978 | Van Hoose | 60/550 |
| 4,309,935 | 1/1982 | Belart | 91/509 |

Primary Examiner—John J. Love
Assistant Examiner—Eric Culbreth
Attorney, Agent, or Firm—Oltman and Flynn

[57] ABSTRACT

An automatic brake actuator for motor vehicles which operates to activate the vehicle brakes at a predetermined rate and at a predetermined amount of force in predetermined conditions. In a particular embodiment, the brake actuator is controlled by an electrical control system which includes a switch in the driver's seat that automatically senses the weight of the driver when seated. The brake actuator may be connected to the vehicle's vacuum brake system and may be combined therewith by means of a unique electrically operated air control valve that is inserted in the vacuum brake air path. An additional electrically operated constraining air valve may be provided which insures that the brake actuator is activated gradually at (a predetermined rate) in order to avoid sudden hazardous stopping of the vehicle. The brake actuator control may include access to other vehicle functions such as theft alarm, etc. to prevent unwanted operation of the vehicle. The control circuit includes provision for maintaining the brakes activated after the driver re-enters the vehicle and until he operates the accelerator pedal or corrects the problems activating the system (low oil pressure, engine overheating, anti-theft or other conditions) that would allow the vehicle to move forward or backwards again.

6 Claims, 9 Drawing Figures

AUTOMATIC BRAKE ACTUATOR WITH CONTROLLED RELEASE

SUMMARY OF THE INVENTION AND PRIOR ART

The invention relates to a novel brake arrangement for automatically applying the brakes of a wheeled vehicle at a predetermined rate with a pre-determined amount of force when the driver leaves the seat of the vehicle, or when other pre-determined conditions exist. More particularly, the brakes are not again released when the driver re-enters the driver's seat until he or she takes a specific action to correct the pre-determined condition that initially activated the brake before again allowing the vehicle to be moved either forward or backward when he or she operates the vehicle's accelerator pedal.

An earlier filed patent application, Ser. No. 06/346,551 entitled Vehicle Brake Actuator Arrangement, by this applicant, disclosed a vehicle brake actuator that automatically energizes a brake actuator mechanically coupled to the vehicle's brake actuating linkage under control of a control circuit that is comprised of an electric seat switch positioned in the driver's seat, which operates through an electrically operated air valve to activate the vehicle's brakes, if the driver for some reason should leave his or her seat, so that the vehicle is prevented from moving without that driver at the controls. Such an arrangement imparts a high degree of safety improvement to the operation of any vehicle, especially if the vehicle were in an accident and the driver were knocked from the driver's seat, or if the driver, being in a hurry, jumps out of the driver's seat without first disengaging the engine from the drive wheels. The present invention is an improvement to the aforesaid patent application Ser. No. 06/346,551, filed Feb. 8, 1982, now abandoned by the same applicant.

It has been found that there can be circumstances wherein a driver in a vehicle equipped with the above identified Vehicle Brake Arrangement, after leaving the vehicle's driver's seat, and the vehicle brake actuator has engaged and activated the brakes, is returning to the driver's seat and finds the vehicle starting to move at the moment the seat switch has again operated, before he has had time to gain control of the vehicle. The present invention overcomes this problem by providing additional control of the vehicle brake actuator system that operates to "remember" that the brake actuator has been engaged and holds the brake actuator in its locked position, until it is again unlocked by some positive act of the driver, preferably the operation of the accelerator pedal. This arrangement is especially of value to drivers of emergency vehicles, whose drivers often are under pressure to quickly jump out of the vehicle and in the haste of the moment may forget to disengage the engine from the drive wheels. The memory element that serves to "remember" to keep the brake actuator locked in position may take the form of a relay that operates and is latched in its operated position and stays operated even when the driver re-enters the driver's seat, but it may be any arrangement that is capable of "remembering" to hold the brake actuator locked in an operated condition. It may be a purely electronic memory device such as a flip-flop or a bit in a microcomputer memory, or it may be a mechanical latch that is released by the operation of the vehicle's accelerator pedal.

The inclusion of a memory element in the brake actuator operating linkage provides means for the addition of suitable ways to prevent unauthorized or unwanted use of the vehicle by inclusion of suitably placed contacts and switches in the brake actuator control circuit, as described in greater detail in the following disclosure.

In the preferred embodiment of the invention as described below, the brake actuator has been combined with the normal vacuum-operated booster so that the two functions share the apparatus housing and most of the brake actuating apparatus as described below.

Means have also been provided to assure a smooth operation of the brake actuator from the moment the seat switch is deactivated in order to avoid a sudden and possibly hazardous deceleration of the vehicle.

In one of the preferred embodiments, the invention is capable of being retrofitted to an existing brake booster system with only a moderate amount of modification to the existing power brake system.

OBJECTS OF THE INVENTION

It is a primary object of the invention to provide an improved brake system with a seat-switch controlled brake actuator that automatically actuates the vehicle's master brake cylinder the moment the driver leaves the seat and so that the brake actuator is not immediately released the moment the driver re-enters the driver's seat.

It is another primary object to provide an improved brake system with brake actuator that may be added to an existing brake booster system with a minimum of modification to the booster system.

It is still another object to provide an improved brake system with brake actuator that is arranged so that the brake actuator applies a gradually increasing brake action when it operates in order to avoid a sudden hazardous deceleration of the vehicle.

It is still another object to provide an improved brake system with brake actuator and a control system that incorporates switches and contacts which serve to prevent driving the vehicle by an unauthorized person or under unauthorized conditions.

It is still another object to provide an improved brake system with a brake actuator that can be actuated automatically by a speed sensor at low speeds which prevents the vehicle from creeping forwards or rolling backwards even with an automatic transmission lever set in the "Drive" or "Reverse" position as when the driver is waiting at a traffic light, bridge opening, etc.

It is still another object to provide an improved brake system with brake actuator that has extended brake holding time by means of increased vacuum storage capactiy, and one-way check valve.

It is still another object to provide an improved brake system with brake actuator that is failsafe, in that the actuator will operate upon engine start-up to make it impossible to move the vehicle if there is a failure in the brake actuator system.

It is still another object to provide an improved brake system with brake actuator that is capable of being produced from readily available components and materials and with methods of fabrication that lend themselves readily to production at a reasonable cost.

Further objects and advantages of this invention will be apparent from the following detailed description of presently preferred embodiments which are illustrated schematically in the accompanying drawings.

BRIEF DESCRIPTION OF THE DRAWINGS

FIG. 3b is an enlarged transverse view of the brake actuator valve seen along the line 3b—3b of FIG. 3a;

DESCRIPTION OF THE PREFERRED EMBODIMENTS

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Figure 1:
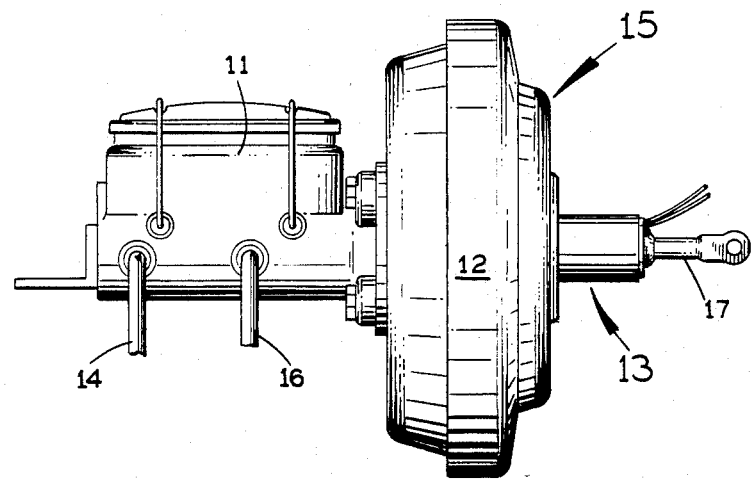
FIG. 1 is an elevational view of the invention showing a combined brake booster and brake actuator in a combined housing attached to a master cylinder assembly.
Figure 7:
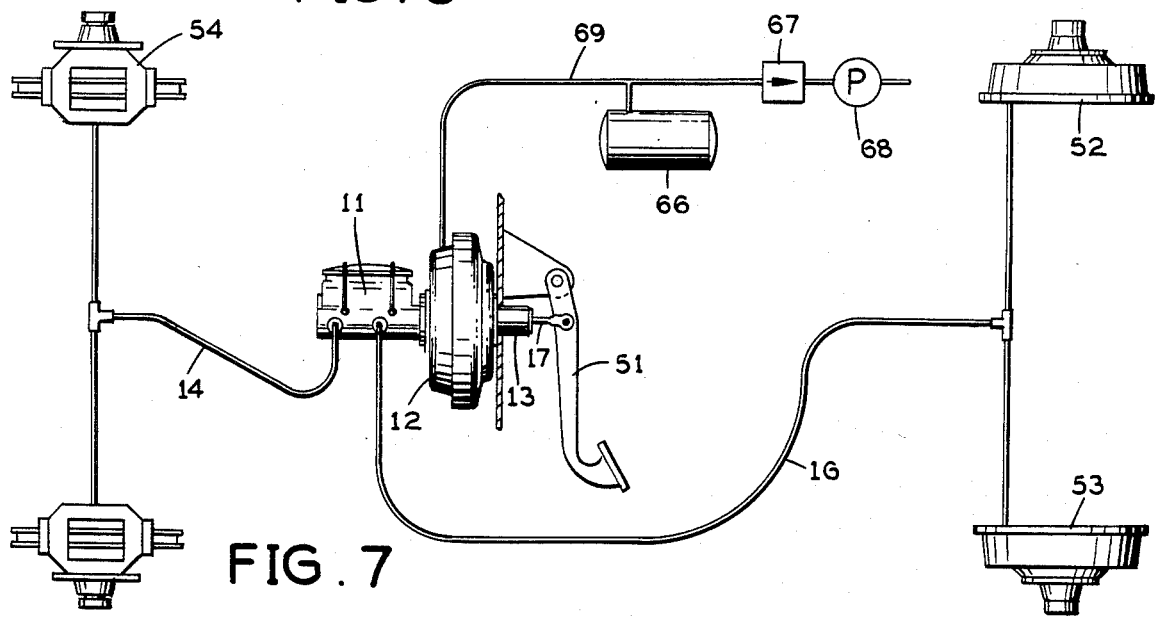
FIG. 7 is a plan diagrammatic view of the invention showing a combined booster and actuator with a combined housing attached to a master cylinder assembly with hydraulic lines to the wheels.

FIG. 1 shows an automatic brake actuator with controlled release according to the present invention, wherein 15 is a combined power brake booster and an automatic brake actuator combined into a single unitary assembly with a housing 12. The housing has on its right hand side a brake control assembly 13 with a brake shaft 17 entering the brake control assembly from the right hand side. The brake shaft 17 is connected to the brake pedal 51, seen in the brake diagrammatic view of FIG. 7. Two hydraulic lines 14 and 16 emerge from a hydraulic master cylinder assembly 11 of conventional design. The hydraulic lines are connected to the wheel brakes 52a, 53a which are rear wheel drum brakes and the front wheel brakes 54 which are usually of the disc brake type in present day construction practice.

Figure 2:
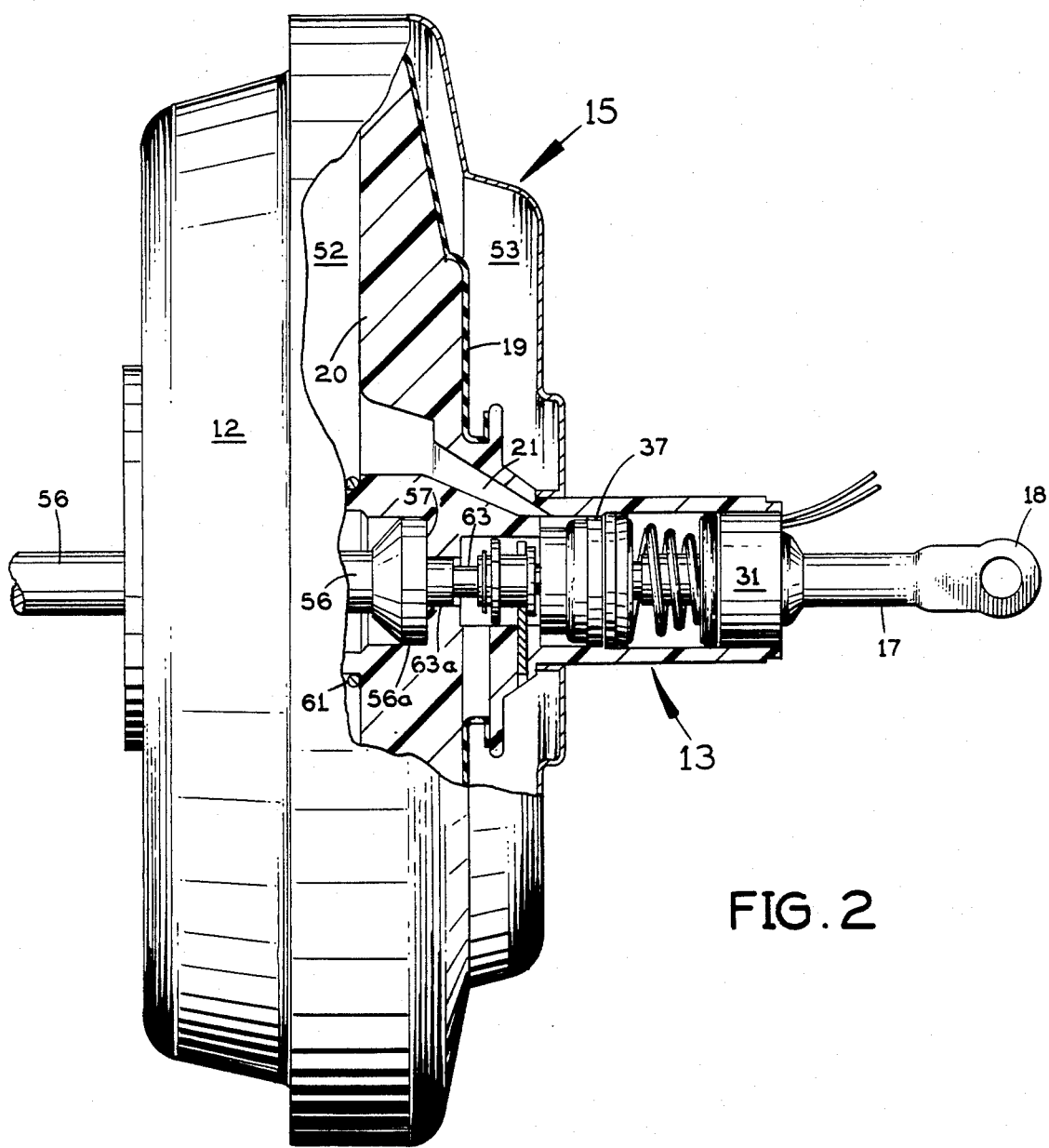
FIG. 2 is an elevational part cross-sectional view of the invention showing the combined brake and actuator housing with part of the housing wall removed to show internal components of the combined brake booster and actuator.

FIG. 2 is an enlarged elevational part cross-sectional view of the combined brake booster and brake actuator assembly with part of the outer wall broken away to show the internal construction of the brake control assembly, generally at 13. The housing 12 is a generally cylindrical shell containing the elements of the brake booster and the actuator.

A generally planar circular diaphragm 19 is disposed inside the housing 12 and concentrically therewith. The diaphragm 19 is constructed from a strong, flexible, airtight material which is attached airtightly to the inside perimeter of the housing 12 and is also attached along its left hand surface to a rigid, generally planar brake plate 20, which also is disposed concentrically with the housing 12, yieldable, and movable in axial direction inside said housing 12.

The diaphragm 19 with the brake plate 20 divides the space inside the housing into two spaces, namely the left hand space generally at 52 facing the front of the vehicle and the right hand space, generally at 53, facing the rear.

The left hand space 52 is connected via a conduit (not shown) to a vacuum source which is conventional and usually consists of an engine driven vacuum pump if on a diesel engine or to the intake manifold of a gasoline engine. The right hand space generally at 53 is vented to the atmosphere through a vent, not shown. The vacuum in the left hand space 52 is connected to the atmosphere through an air leakage channel which allows a moderate amount of vacuum—typically 7–8 pounds per square inch ("psi") to exist on the left hand side of the diaphragm 19. The diaphragm is maintained in its normal, not braking, right hand position as shown in the figures by a sturdy helical, partially compressed return spring 61, a part of which is seen in FIG. 2. The partially compressed return spring 61, disposed coaxially with the brake housing 12, rests with its left hand end against the left hand inner surface of the brake housing and with its right hand end against the diaphragm plate 20, and exerts enough pressure thereon to overcome the moderate vacuum in the space 52 on the left hand side of the diaphragm, which urges the diaphragm toward the left, against the helical spring 61. The helical spring 61 is positioned in a manner similar to that of the helical spring 62 seen in FIG. 5.

Figure 3:
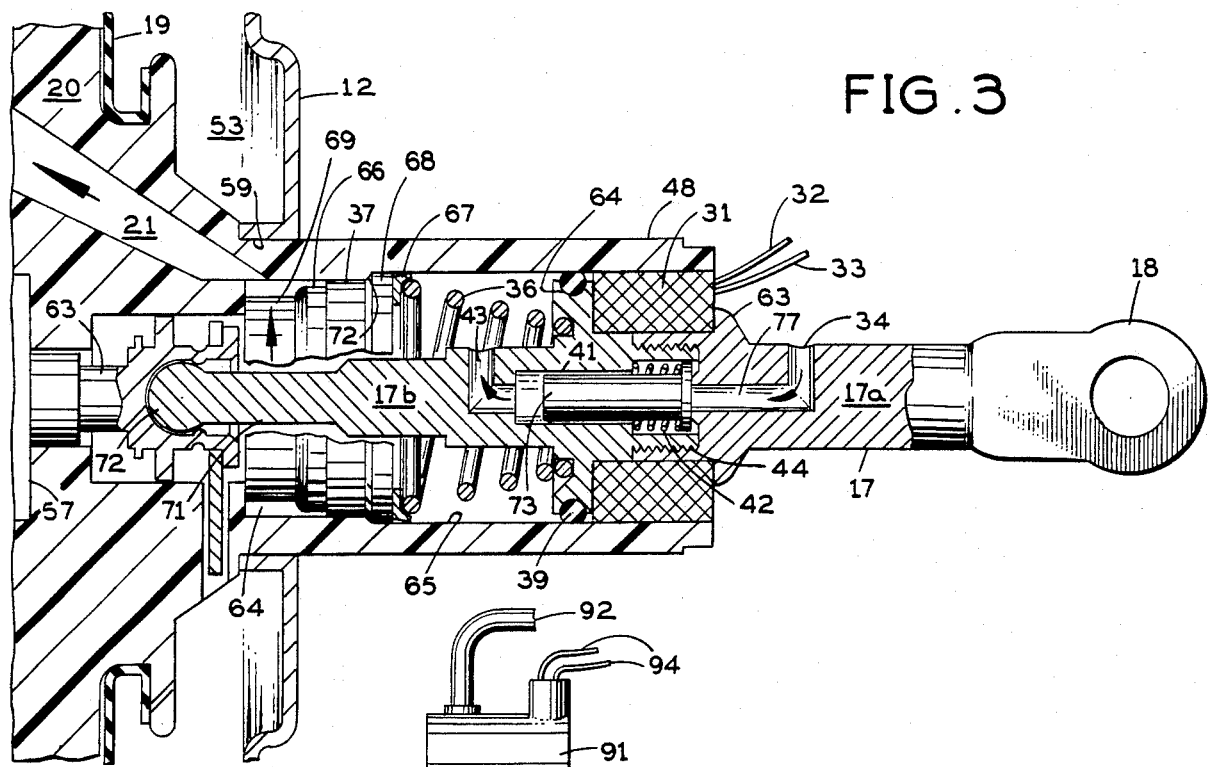
FIG. 3 is an elevational cross-sectional fragmentary enlarged detail view of the invention showing details of the combined booster and actuator control mechanism with the actuator in its energized non-active condition.

The leakage path for the vacuum in the space 52 to the left of the diaphragm is controlled by the brake control components seen in greater detail in FIG. 3, such that when the flow of air into space 52 is reduced, the vacuum will increase, and pull the diaphragm to the left, with the diaphragm plate 20, which is in turn connected with the brake rod 56, and operates the piston(s) in the master cylinder 11 and produces hydraulic pressure which is in the conventional manner connected to the wheel brakes by the hydraulic brake lines 14 and 16. The right hand end of the brake rod is flared to form an extended brake rod shoe 56a which rests against the diaphragm plate 20 at the circular recess 57.

The diaphragm plate 20 (FIG. 3) extends as a cylindrical tubular projection 48 (FIG. 3) slidably through a corresponding circular opening, 59, disposed concentrically in the right hand side of the brake housing 12. The brake shaft 17, disposed concentrically inside said tubular projection, consists of two parts, the outer part 17a and the inner part 17b, said parts joined in a threaded connection 44. An electrical solenoid 31, containing many turns of insulated wire and terminated in two terminating wires 32 and 33 is positioned concentrically with said brake shaft 17 and contained rigidly between an outer collar 63 at the left hand end of the outer brake rod 17a and an inner collar 64a at the right hand end of the inner brake shaft 17b. The inner collar 64a is sealed airtightly against the inside, larger tubular wall 65 of the tubular projection 48 with the sealing O-ring 39 positioned in a circular groove in said inner collar 64a.

The entire brake shaft 17 is axially slidable inside tubular projection 48 with the solenoid 31 rigidly attached to said brake shaft 17 but slidable in aforesaid inside larger tubular wall 65. The shaft 17 is shown in its most right hand position with the brakes, not activated, in their normal position. Pressure on the brake pedal 51 (FIG. 7) moves the brake shaft axially to the left against the pressure of the helical brake shaft return spring 36, which, at its right hand end rests against the left hand inside surface of the inner collar 64a, and at its left hand end against the return spring stop ring 67 and spring retainer ring 68.

A generally cylindrical poppet valve 37 is rigidly attached to the inner brake shaft section 17b, and axially slidable, snugly fitting against the inside smaller tubular wall 64 of the tubular projection 48. A circular flexible poppet seal 66 is attached to the forward facing surface of the poppet valve 37 and meets the rearward facing side of spacer ring 69, which again fits axially slidably on a forward facing cylindrical projection 71 of the inner brake shaft 17b. The forward facing projection 71 is terminated in a spherical knob 72a which engages a matching rearward facing concave cavity in a link 63, which in turn shuts against the rearward facing surface 57 of the brake rod 56.

Operation of the brake booster when initiated by the driver, operating the brake pedal 51, takes place in a manner which is generally conventional for vacuum assisted brake boosters used in automobiles and trucks, and takes place as follows: The driver operates the brake pedal 51, (FIG. 7) which is pivotally attached to the eye 18 of the brake shaft 17. As a result the entire brake shaft 17 moves forward (to the left) against the return spring 36, pushing with it in forward direction the poppet valve 37 with the poppet seal 66 and the spacer ring 69, which pushes against the rearward facing surface 72 of the inside smaller tubular wall 64 of the tubular projection 48. The tubular projection 48, being part of the diaphragm plate 20, resists the forward directed force with the rearward directed force of the diaphragm return spring 62. The difference in the two forces causes the flexible poppet seal 66 to be "squeezed" between the spacer ring 69 and the poppet valve 37. As a result, the poppet seal expands towards the inside wall 64 and thereby restrains the air flow from the atmosphere through the vent 34 in the outer brake shaft 17a through the brake actuator cavity 41 and vent 43, the details of which are described below, by the spacer ring 69 and through the vent 21 into the vacuum of the left hand chamber 52 (FIG. 2). As soon as the air flow is restrained, the degree of vacuum in the chamber 52 increases, in other words the air pressure goes lower, resulting in reduced pressure on the left hand side of the diaphragm 19 causing the diaphragm to move axially forward with its plate 20. The forward motion relieves the pressure on the poppet seal 66 just enough to ensure that the diaphragm plate is moved forward a distance corresponding to the displacement of the brake shaft 17, caused by the driver depressing the brake pedal 51 (FIG. 3).

It follows that complete stoppage of the air flow, described above, would cause the vacuum in chamber 52 to develop to its full force, since air is continuously withdrawn from the chamber 52 by the vehicle's vacuum source, and thereby develop the maximum, full braking force on the diaphragm plate 20, which is, as described above, coupled to the master cylinder 11 through the brake rod 56.

The brake actuator, according to the present invention, operates on the principle of stopping the air flow through the vent 34 by means of an actuator valve, controlled by the solenoid 31, when the actuator control apparatus senses a need for stopping the vehicle.

Figure 3A:
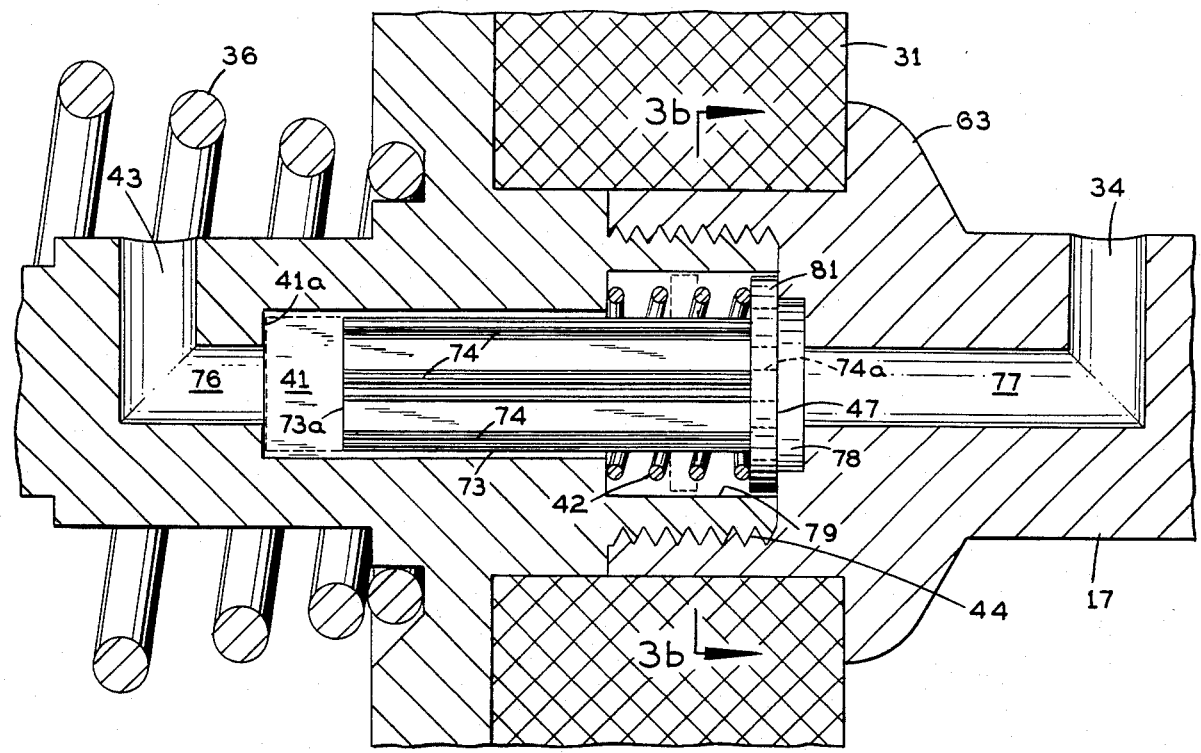
FIG. 3a is an enlarged axial cross-sectional view of the brake actuator valve showing details of its inner construction.
Figure 3B:
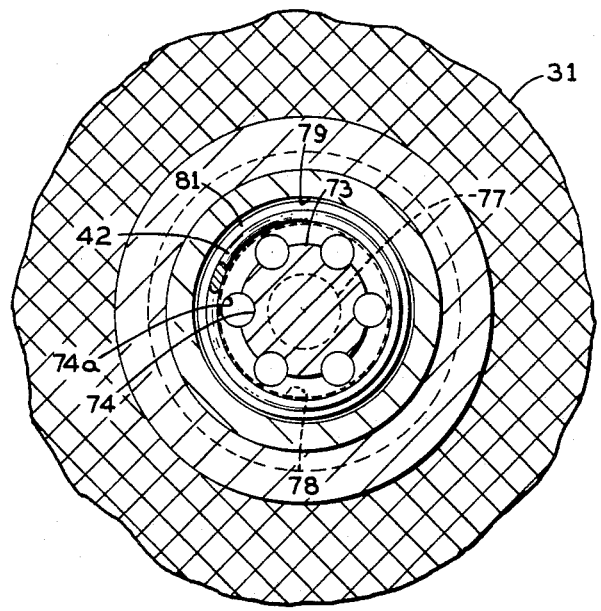
Figure 4:
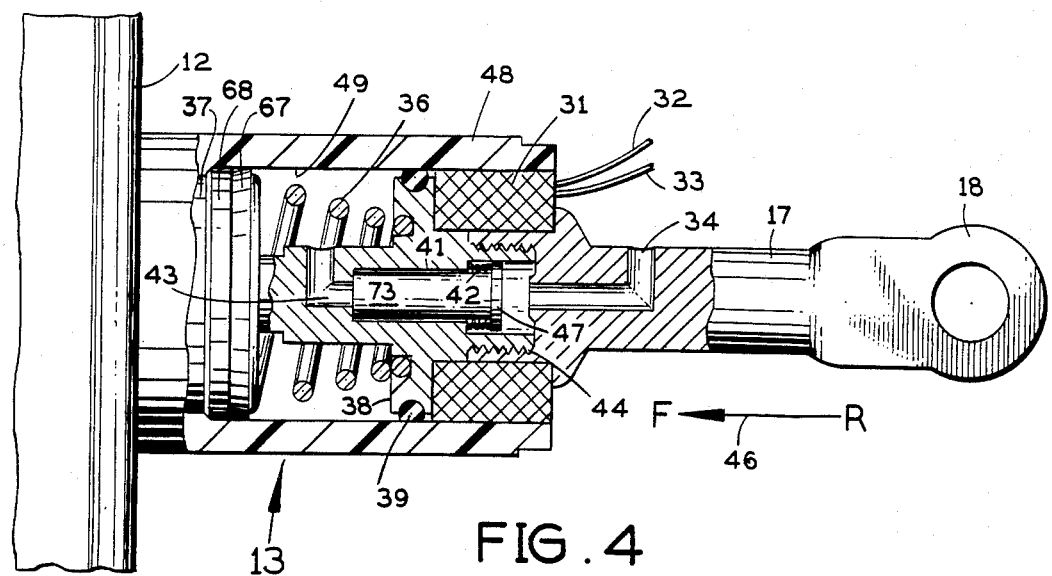
FIG. 4 is an elevational cross-sectional fragmentary enlarged detail view of the invention showing the details of FIG. 3, but with the actuator control mechanism in its non-energized active condition.

The brake actuator valve seen as parts of FIGS. 3 and 4 and in enlarged detail views in FIGS. 3a and 3b, comprises a cylindrical elongated plunger 73 made from magnetic material and positioned coaxially with aforesaid brake shaft 17, inside and axially slidable in a matching cylindrical cavity 41, which forms part of the vacuum leakage passage beginning with the air inlet vent 34 and the air outlat vent 43. The plunger 73 has, as better seen in FIGS. 3a and 3b, a circular flange 81 at the right hand end of the plunger. The plunger body has axially oriented, circumferentially disposed grooves 74 which extend as circular apertures 74a through the flange 81. A helical spring 42 is positioned coaxially with the body of the plunger 73 and attached, at its right hand end, to the leftward facing surface of the flange 81 and at its left hand end it is attached to the rightward facing surface of an extended cylindrical space 79, which is an extension of the cylindrical space 41 containing the plunger body 73 and serves to provide space for the spring 42.

The helical spring 42, being attached at both ends operates to exert a pulling force in leftward direction on the plunger 73; at the same time the solenoid 31, when energized, exerts a still stronger rightward force on the plunger which is shown in its most right hand position on FIG. 3 and in the enlarged FIGS. 3a and 3b, and in its most left hand position in FIG. 4, with the left hand end surface of the plunger 73 abutted against the left hand end, to the right facing inside end surface 41a of the cavity 41.

The plunger, in its right hand position, with the solenoid 31 energized, provides for air passage from the vent inlet 34 through vent opening 77 and through the groove holes 74a in the plunger flange 81, through the grooves 74 and through the vent 76 and from there, as explained above, to the vacuum space 52 (FIG. 2). Conversely, when the plunger is at its most left hand position, as shown in phantom lines in FIG. 3b, the plunger body 73 is blocking the flow of air, and therefore, provides for complete activation of the brakes, which as explained above, takes place when the solenoid 31 is de-energized.

The blocking of the air flow in the plunger's most lefthand position is effected by the left hand, leftward facing surface 73a of the plunger body 73 being urged by the spring 42 against the right facing mouth 76 of the vent pipe 43, shown in phantom line in FIG. 3b. The circumference of the mouth 76, as seen, is completely inside the cross section of the grooves 74 in the plunger body 73, and therefore it follows, no air can pass through the valve when the solenoid 31 is de-energized.

The invention as described above is based on its use in combination with a conventional hydraulic master brake cylinder using a vacuum assisted power brake canister. There are other versions of power brakes, and in all cases where a power air brake is provided and where the brake may be activated at a point in the flow of air connected with the brake by means of a controlled valve, it follows that the present inventive concept may be applied to attain the objects listed above.

Figure 5:
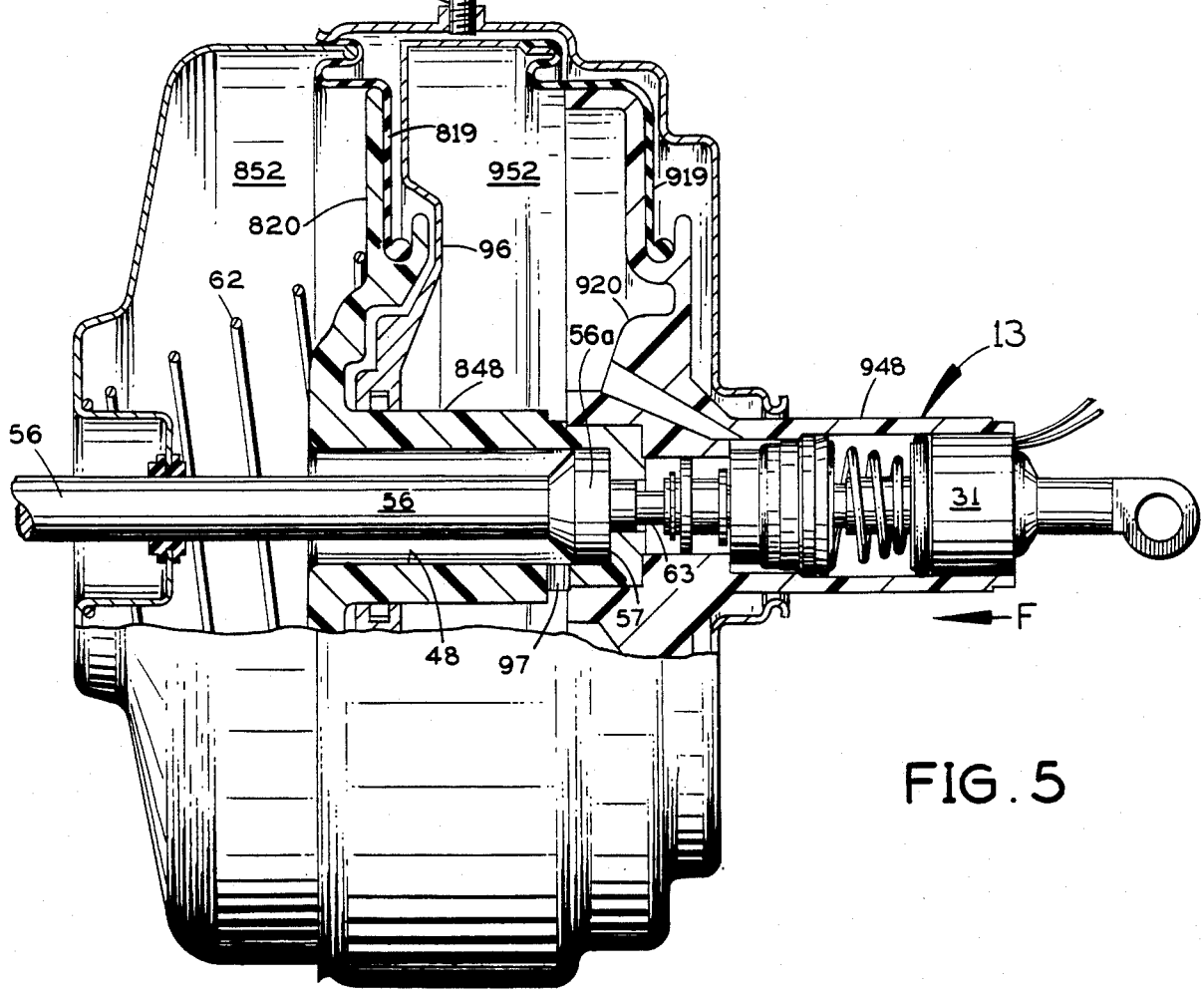
FIG. 5 is an elevational part cross-sectional view of the invention showing an embodiment with two diaphragms, and some of the control components.

FIG. 5 shows in an elevational, cross-sectional view a power vacuum brake constructed by the Bendix Corporation which uses two coordinated diaphragms. The following description thereof is based on a service bulletin published by that Corporation. The use of two diaphragms has the advantage of providing twice the braking power, compared with the brake booster described with FIG. 2, in a single compact housing.

In order to avoid repetitious description, the elements of the brake booster shown in FIG. 5 are shown with the same reference number as the corresponding elements in FIG. 2, except an "8" has been prefaced to those elements relating to the front diaphragm and a "9" has been prefaced to those elements relating to the rear diaphragm. The elements of the brake control assembly 13 that are similar have been given the same reference numbers. The arrow F points to the front of the vehicle.

In FIG. 5, the front diaphragm 819 is connected with front plate 820 which engages the brake rod 56 as described above with FIG. 2. The rear space 952 is connected to the vehicle's vacuum source through an electrically controlled air valve 91 known as a "Skinner Valve", but other types of air valves are known and suitable for this application.

An interior wall 96 divides the space inside the housing into the two spaces 852 and 952 which both are connected to the vacuum source. A vent 97 in the wall 48 of tubular projection 848 extending from the front plate 820 transmits vacuum from the space 852 to the space 952.

The Skinner valve 91, which is conventional, contains a solenoid which is energized from two terminal leads 94 such that when the solenoid (98 in FIG. 6) is energized, the flow of air through the valve from the inlet 92 to the outlet 93 is constrained. The skinner valve serves to reduce the rate of air flow from the chambers 852 and 952 to the vacuum source when the actuator is operated in order to provide a gradual application of the brakes rather than an abrupt sudden application which may be hazardous.

The Skinner valve is operated simultaneously with the brake actuator control 13, but not during normal brake actuation which is initiated by the driver depressing the brake pedal 51.

It follows that the Skinner valve may be applied also to the single diaphragm version of the brake booster shown in FIG. 2, in which case it would be attached at a convenient point of access to the left hand space 52.

Figure 6:
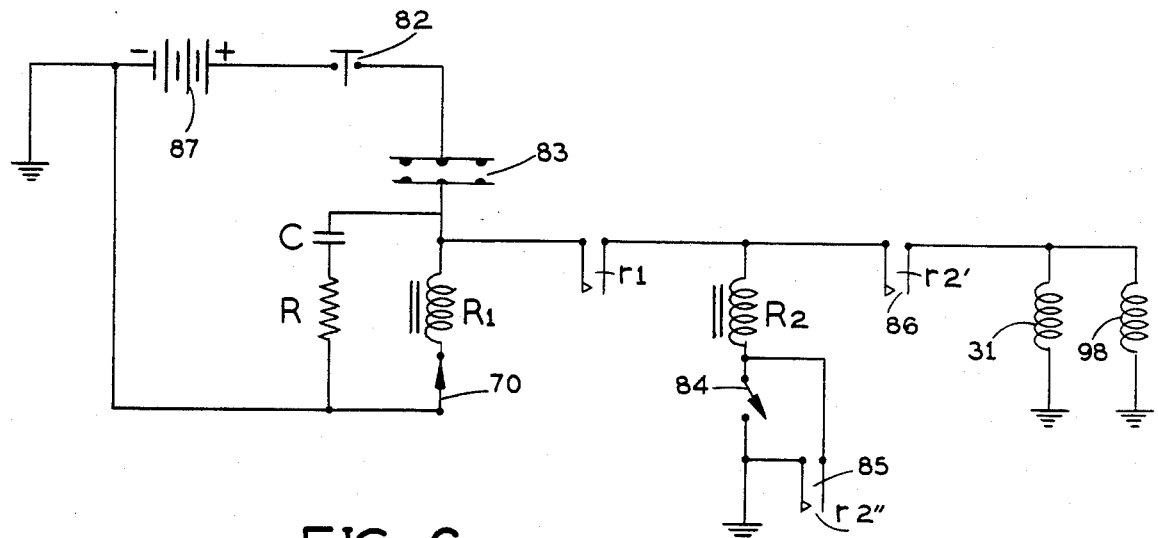
FIG. 6 is a schematic circuit diagram of the invention showing the electrical control circuit.

The electrical control mechanism for the brake actuator described herein, is shown in the schematic circuit diagram in FIG. 6. In the diagram 87 is the vehicle's battery, usually with its negative terminal connected to the vehicle frame and the positive terminal connected to the ignition switch 82. A seat switch 83 is installed in the driver's seat and operates so that its contacts are closed when the driver is seated and open when he is not seated. The seat switch is connected to the coil of a first relay R1 having a make contact r1 also connected to the seat switch. The make contact r1 continues to the upper terminal of the coil of a second relay R2 which has two make contacts r2' and r2" (86 and 85 respectively). Contact r2" is connected between the lower terminal of coil R2 and frame and is parallel-connected with a gas pedal connected switch 84 with a make contact. The contact r2' (86) continues to the operating solenoid 31 of the brake actuator and to the operating coil 98 of the Skinner valve 91, if used.

OPERATION

The automatic brake actuator operates as follows:

A driver sits on the driver's seat which closes the seat switch 83. He turns the ignition switch 82 to the "run" position in preparation for starting the engine. He starts the engine. The seat switch energizes the coil R1 of the first relay, which, operating its make contact r1, allows positive battery power to flow to the coil R2 of the second relay, which does not yet operate because gas pedal contact 84 is open and make contact 85 is open.

When the driver depresses the accelerator pedal (51 of FIG. 7), contacts 84 make and complete the operating circuit for the second relay R2, which operates and closes its make contacts r2" (85), which, in turn extends positive battery power to coil 31 of the brake actuator and to the coil 98 of the Skinner switch if provided. The driver can now operate the vehicle since the positive battery power has operated brake actuator coil 31 which takes the pressure off the brake shaft actuator 17 and removes braking action from the wheels as described above. In driving the vehicle, the driver can remove his foot from the accelerator and open contact 84 of the gas pedal switch, but the second relay R2 will stay operated locked to its own make contact r2". If however, the driver leaves his seat, R2 will immediately release since the seat switch 83 contacts will open, and the brake actuator coil 31 will be de-energized and actuate the brakes.

In order to avoid momentary releases of the relays R1 and R2 if the vehicle bounces over some obstacle, allowing the driver's weight to leave the seat and the seat switch momentarily to open, capacitor (C) in series with a current limiting resistor R serves to keep relay R1 operating for some time, typically a few seconds, in order to avoid unwanted repeated application of the brake actuator. Other means may be used to effect slow release of the relays such as specially constructed armatures or other suitable means.

When the driver leaves the seat, if he should neglect to stop or disconnect the engine, the seat switch 83 will open and the relays R1 and R2 drop, de-energizing the brake actuator solenoid 31, the valve plunger 73 is released and is thrown to its left hand, braking position, causing the vacuum to operate the brake actuating arm 56 which will apply pressure to the master cylinder and bring the vehicle to a halt.

When the driver later re-enters the seat, the brakes remain locked or "on"; that is, the brake actuator solenoid 31 stays de-energized, and the vehicle is prevented from moving forward until the driver actuates the accelerator pedal 51, which causes the accelerator switch 84 to momentarily close and the relays R1 and R2 to operate.

The control system described above is well suited to implement means for preventing unauthorized use of the vehicle Such means may consist of a normally closed contact in a con- venient place in the circuit. A break contact 70 is shown in series with the coil of the first relay R1 which may represent a contact connected with a theft alarm connected to the vehicle, or could be used in connection with some device to require the driver to pass a sobriety test in the form of a breath-analyzer test or the like before releasing the brakes. An anti-collision system could also be incorporated. Additional conditions for automatically stopping the vehicle may include low engine oil pressure or engine overheating, which may also be arranged to engage the contact 70.

A make contact 75 may be a push contact at the driver's seat which a driver may conveniently operate momentarily in order to prevent the vehicle from creeping forward when stopped at a traffic signal, bridge opening, etc.

In cases where it is desirable to maintain the vehicle braked with the brake actuator for any length of time without the engine operating, it is possible to add a vacuum tank 66a (FIG. 7) and a one-way check valve to the vehicle's vacuum system. The larger volume of vacuum thus attained can maintain the brakes operated for a long time depending on the volume of the tank and leakage in the system. In case a tank is used, a one-way check valve 67a may be inserted in the vacuum line 69a to the pump 68a or manifold in order to prevent the vacuum in the tank from leaking from the tank through the vacuum pump or intake manifold when the engine is stopped.

Braking action by means of the brake power booster operates as follows: The brake pedal 51 is depressed by the driver in order to start braking. The brake shaft 17, attached to the brake pedal at the brake shaft eyelet 18, is driven to the left, as best seen in FIG. 3.

In the invention as disclosed above, the forces of the vacuum acting on the diaphragm is the force used to activate the brakes through the master cylinder and piston, and a return spring (62 in FIG. 5) is acting against the force of the vacuum. This is the mode of operation usually provided in power brakes for automobiles. In a different mode of operation, the two forces are reversed such that the spring force is used to activate the brakes while the force of vacuum acts against the spring to release the brakes. Such an arrangement has the advantage that the spring force may hold the brakes operated indefinitely with a pre-determined amount of force—unlike the pressure created by the vacuum force that may be lost as the vacuum is lost through leakage.

The linkage between the brake pedal and the brake actuator is described above using a brake shaft directly connected as a push rod between the brake actuator and the brake pedal. It follows that such linkage could include pulling force elements, directly from the brake pedal to an externally mounted diaphragm operated vacuum cannister, such as with steel cable or section of chain.

The brake actuator control is described using two interacting relays R1 and R2. It follows that there are many other ways in which such an actuator could be controlled, while still attaining the same results. As examples, solid state components and logic circuits such as "Flip-Flops", "And" and "Or" gates may be used, or stored program control using a dedicated micro-computer or a general micro-computer as now used in many automobiles for engine controls and so forth.

It follows that the brake actuator control may be coupled to vehicle alarms, such as horns or lights in order to indicate the vehicles unauthorized use.

The system is capable of multiple functions and multiple applications.

I claim:

1. In a brake system for a motor vehicle having a brake, said brake system comprising:
    a brake pedal operable in one direction to apply the brake;
    a reciprocable brake shaft operated by said brake pedal;
    a vacuum operated booster for said brake comprising a housing having a variable pressure chamber therein, a movable wall extending transversely across the interior of said housing on one side of said variable pressure chamber, and means for connecting said variable pressure chamber to a source of vacuum, said movable wall having an annular extension on the opposite side from said variable pressure chamber slidably supported on said housing and receiving said brake shaft reciprocably, and said movable wall having an air passageway providing fluid communication between said variable pressure chamber on said one side of the movable wall and the interior of said annular extension on the opposite side;
    and flow restriction means on said brake shaft inside said annular extension for restricting the flow of air from the interior of said annular extension into said air passageway in said movable wall upon displacement of the brake shaft by the brake pedal toward said movable wall;
  the improvement wherein:
    said brake shaft has a passageway therein for providing fluid communication between the interior of said annular extension and the atmosphere, said brake shaft passageway defining a valve seat;
    a magnetic valve member in said brake shaft passageway engageable with said valve seat to block fluid communication between the interior of said annular extension and the atmosphere;
    spring means biaaing said valve member into engagement with said valve seat;
    and a solenoid coil inductively coupled to said valve member for unseating said valve member from said seat in response to energization of the coil, whereby to connect said variable pressure chamber to the atmosphere through said air passageway in said movable wall and said annular extension.

2. A brake system according to claim 1, wherein:
    said valve member is a plunger slidably reciprocable in said brake shaft passageway and having a plurality of longitudinal grooves therein;
    and said brake shaft has an interior wall extending transverse to said plunger and providing said valve seat for engagement by the adjacent end of the plunger to block said grooves in the plunger.

3. A brake system according to claim 2, wherein:
    said solenoid coil encircles said brake shaft, is slidably received in said annular extension and is rigidly coupled to said brake shaft for movement in unison therewith.

4. A brake system according to claim 3, wherein:
    said passageway in the brake shaft is on the opposite side of said flow restriction means from said air passageway in said movable wall.

5. A brake system according to claim 1, wherein:
    said passageway in the brake shaft is on the opposite side of said flow restriction means from said air passageway in said movable wall.

6. A brake system according to claim 1, wherein:
    said solenoid coil encircles said brake shaft and is slidably received in said annular extension and is rigidly coupled to said brake shaft for movement in unison therewith.

* * * * *